(12) United States Patent
Sekine

(10) Patent No.: US 8,125,504 B2
(45) Date of Patent: Feb. 28, 2012

(54) IMAGE FORMING APPARATUS AND CONTROL PROGRAM OF IMAGE FORMING APPARATUS

(75) Inventor: Haruyuki Sekine, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 996 days.

(21) Appl. No.: 12/098,793

(22) Filed: Apr. 7, 2008

(65) Prior Publication Data

US 2008/0304845 A1     Dec. 11, 2008

(30) Foreign Application Priority Data

Jun. 8, 2007  (JP) .................. 2007-153043

(51) Int. Cl.
 B41J 2/47   (2006.01)
 B41J 2/455  (2006.01)
 B41J 2/435  (2006.01)
(52) U.S. Cl. ......... 347/233; 347/225; 347/237; 347/247
(58) Field of Classification Search .................. 347/225, 347/233, 237, 247
See application file for complete search history.

(56) References Cited

U.S. PATENT DOCUMENTS

| | | | |
|---|---|---|---|
| 4,578,689 A * | 3/1986 | Spencer et al. | 347/129 |
| 6,825,863 B2 * | 11/2004 | Shimomura et al. | 347/129 |
| 2003/0184638 A1 | 10/2003 | Shimomura et al. | |
| 2009/0021802 A1 * | 1/2009 | Sawada | 358/481 |
| 2010/0231684 A1 * | 9/2010 | Suga | 347/247 |

FOREIGN PATENT DOCUMENTS

| | | |
|---|---|---|
| JP | 63-124664 | 5/1988 |
| JP | 8-171061 | 7/1996 |
| JP | 9-123521 | 5/1997 |
| JP | 10-138560 | 5/1998 |
| JP | 2000-118040 | 4/2000 |
| JP | 2002-166592 | 6/2002 |
| JP | 2005-288773 | 10/2005 |

OTHER PUBLICATIONS

Machine English Translation of JP 2000-118040.*
European Search Report dated Aug. 25, 2008.

* cited by examiner

*Primary Examiner* — Uyen-Chau Le
*Assistant Examiner* — John M Bedtelyon
(74) *Attorney, Agent, or Firm* — Finnegan, Henderson, Farabow, Garrett & Dunner, L.L.P.

(57) ABSTRACT

An image forming apparatus for simultaneously conducting multiple lines of exposure by scanning multiple laser beams from multiple light sources onto an image carrier in a main scanning direction, including: multiple light sources which are driven to emit laser beams based on image data; and a control section capable of controlling an image formation in two types of image forming modes of a first image forming mode where an image is formed at a first image forming speed by using all the multiple light sources, and a second image forming mode where the image is formed without using at least one of the multiple light sources at a second image forming speed slower than the first image forming speed, wherein the control section controls a light source which is not used in the second image forming mode to emit a laser beam onto outside of an image area.

8 Claims, 6 Drawing Sheets

FIG. 7(a) TIMING CHART OF HORIZONTAL SYNCHRONIZING SIGNAL DETECTION — HORIZONTAL SYNCHRONIZING SIGNAL
FIG. 7(b) PRIMARY SCANNING AREA SIGNAL
FIG. 7(c) LD_1
FIG. 7(d) LD_2
FIG. 7(e) LD_3
FIG. 7(f) LD_4

IMAGE FORMING APPARATUS AND CONTROL PROGRAM OF IMAGE FORMING APPARATUS

CROSS REFERENCE TO RELATED APPLICATION

The present application is based on Japanese Patent Application No. 2007-153043 filed with Japanese Patent Office on Jun. 8, 2007, the entire content of which is hereby incorporated by reference.

BACKGROUND OF THE INVENTION

1. Field of the Invention

The present invention relates to an image forming apparatus such as a copier and a program of the image forming apparatus, and particularly to an image forming apparatus having a function to write an image of multiple scanning lines in a single scanning process onto a recording medium such as a photoreceptor by utilizing laser beams from multiple light sources, and a control program thereof.

2. Description of the Related Art

An image forming apparatus is known which forms one line image in a main scanning direction based on image data, and forms one page of image by repeating the image formation of the main scanning direction line by line in a sub-scanning direction.

As an example, an electrophotographic image forming apparatus scans a laser beam modulated based on image data in the main scanning direction onto an image carrier, and in parallel to the main scanning, forms an image by the use of the laser beam on the image carrier (photoreceptor drum) rotating in the sub-scanning direction. In this case, by the reference of a clock signal (pixel clock), which is also called a dot clock, the laser beam is modulated based on the image data.

Further an image forming apparatus is known which is provided with two or more light sources such as laser diodes (LD), uses laser beams from the multiple light sources, and by repeating the image formation of multiple lines in the main scanning direction based on the image data in the sub-scanning direction, performs image formation of a single page. The multi-beam type image forming apparatus is described in such as Unexamined Japanese Patent Application Publication No. 63-124664 (abbreviated to JPA63-124664).

Further, regarding the multi-beam type image forming apparatus, various types are described in such as JPA63-124664, JPA2002-166592, and JPA2005-288773.

Although it is possible to form an image on a transfer sheet other than normal paper, such as a sheet of thick paper which needs to pass through a fixing section at a slower speed. In such case, it is necessary to lower the transporting speed of the transfer sheet.

In such low speed image formation, if the rotating speed of a polygon mirror is changed, since the load onto a polygon motor is increased, it is not preferable for using the image forming apparatus stably for a long period.

In this regard, there is a method to change the image formation speed in the multi-beam image formation, by decreasing the number of uses beams, namely the number of used light sources, without changing the rotating speed of the polygon mirror.

However, in this case of decreasing the number of used light sources, the difference of light emitting period between the used light source and the unused light source is generated, and a problem results in that the state of light source deterioration differs by each of the light sources.

In JPA63-124664, although technologies regarding the multi-beam type image forming apparatus are generally described, the difference of the deterioration state between the multiple light sources is not taken into account.

In JPA2002-166592, technology regarding beam switching is disclosed, however this causes a new problem in that the program capacity (memory capacity) must be increased due to the complicated control program.

Further, in JPA2005-288773, a technology is disclosed which equalizes the deterioration by switching the light sources to be used for every page when there is a mode where any of the light sources is not used. In this case, it is necessary to control the switching of light sources page by page, and a new problem may be generated in that image quality changes page by page due to the switching of the light sources. This image quality change may be a serious problem since this leads to a color shift in case of color image formation.

The present invention is accomplished to solve the abovementioned problems, and to provide an image forming apparatus and control program of the image forming apparatus which prevents the deterioration of image quality, by equalizing the deterioration state of each light source as much as possible when multiple exposure laser beams are used, and thereby the light sources can be stably used.

SUMMARY OF THE INVENTION

In order to solve at least one of the abovementioned problems, an apparatus reflecting one aspect of the present invention is an image forming apparatus for simultaneously conducting multiple lines of exposure by scanning multiple laser beams from multiple light sources onto an image carrier in a main scanning direction, including:

multiple light sources which are driven to emit laser beams based on image data; and a control section capable of controlling an image formation in two types of image forming modes of a first image forming mode where an image is formed at a first image forming speed by using all the multiple light sources, and a second image forming mode where the image is formed without using at least one of the multiple light sources at a second image forming speed slower than the first image forming speed, wherein, the control section controls a light source which is not used in the second image forming mode to emit a laser beam onto outside of an image area where the image is formed based on the image data.

The image forming apparatus reflecting another aspect of the present invention is provided with a polygon mirror which scans laser beams from the multiple light sources in a main scanning direction, wherein the control section executes the second image forming mode at the second image forming speed slower than the first image forming speed by changing a number of used light source without changing a rotation speed of the polygon mirror between the first image forming mode and the second image forming mode.

In the image forming apparatus reflecting still another aspect of the present invention, the laser beam emission onto outside of the image area is an emission for latent image formation to stabilize cleaning of the image carrier.

In the image forming apparatus reflecting yet another aspect of the present invention, the laser beam emission outside the image forming area is an emission for detecting a horizontal synchronization signal.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENTS

Referring to the drawings, the preferred embodiments of the present invention will be described below. The image forming apparatus, to which the present embodiment applies, is a multi-beam type image forming apparatus which simultaneously executes multiple lines of exposure in the main scanning direction, on an image carrier by scanning of multiple laser beams from multiple light sources.

Figure 1:
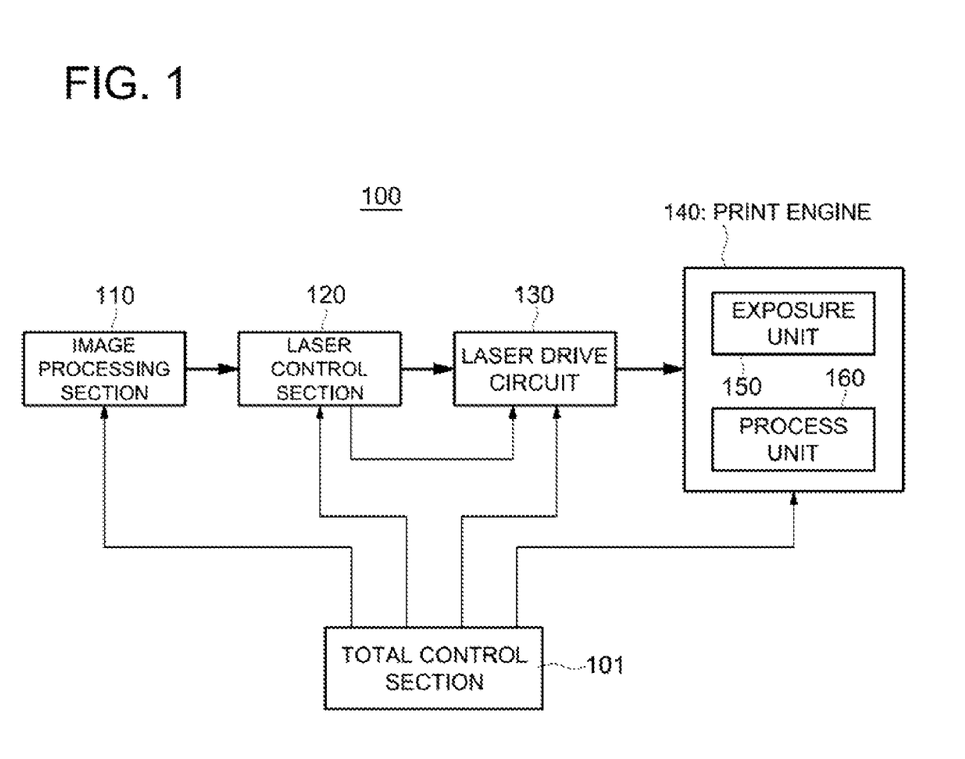
FIG. 1 is a block diagram showing a configuration of an image forming apparatus relating to an embodiment of the present invention.

The electrical configuration of the first embodiment of the multi-beam type image forming apparatus 100 will be described in detail based on FIG. 1. In the following description of the present embodiment, mainly explained will be basic requirements of image forming apparatus 100 utilizing the multiple laser beam exposure which prevents deterioration of image quality. Therefore, common and well-known configuration features are omitted.

First Embodiment

Sign 101 indicates a total control section configured with such as a CPU to control each part of image forming apparatus 100. Sign 110 indicates an image processing section to execute prescribed image processing onto image data. Sign 120 indicates a laser control section to regulate laser emission in accordance with the image data and prescribed command data. Sign 130 indicates a laser drive circuit to drive light sources based on the control of laser control section 120. Sign 140 indicates a print engine to form images by exposure, which includes exposure unit 150 to conduct scanning of multiple laser beams, and process unit 160.

Figure 2:
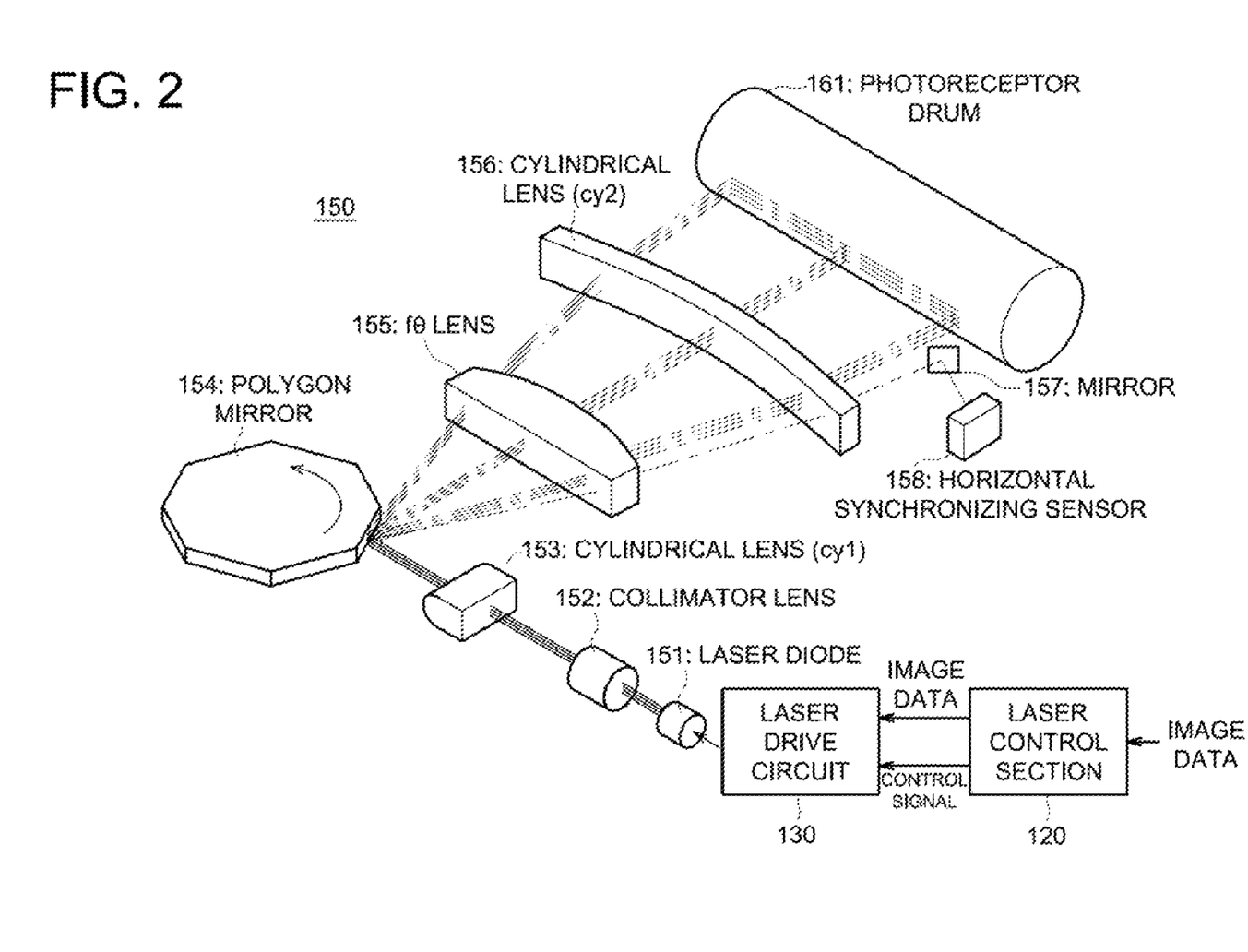
FIG. 2 is a schematic diagram showing a configuration of an image forming apparatus relating to an embodiment of the present invention.

FIG. 2 schematically shows the parts of laser control section 120, laser drive circuit 130, and exposure unit 150 partially in perspective view. Further, the parts shown in perspective view in FIG. 2 are illustrated in FIG. 3 in a plan view.

Figure 3:
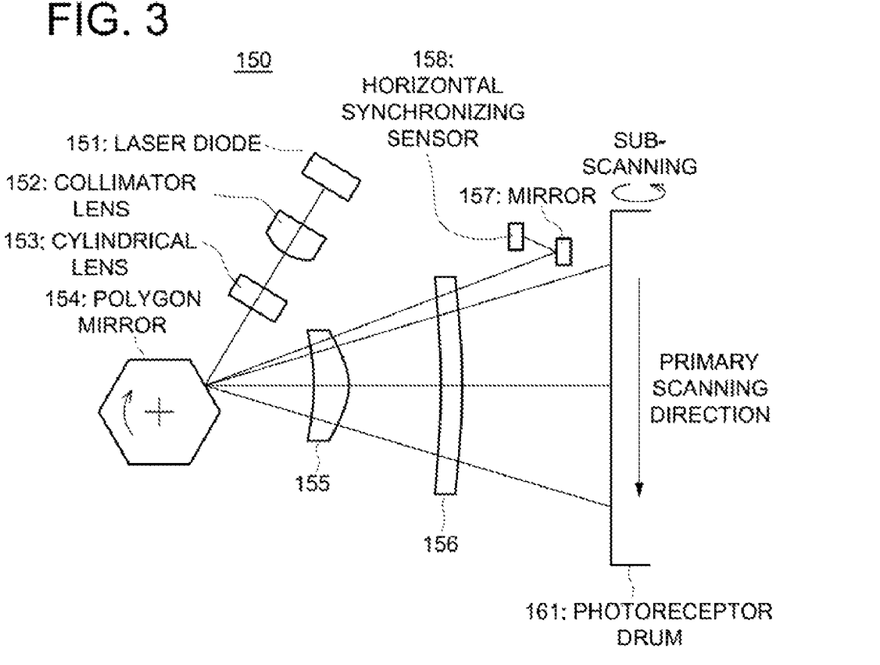
FIG. 3 is a schematic diagram showing a configuration of the image forming apparatus relating to an embodiment of the present invention.

In FIG. 2 and FIG. 3, exposure unit 150 comprises laser diode 151 as multiple light sources which generate multiple laser beams, collimator lens 152 and cylindrical lens 153 which perform various optical corrections of the laser beams, polygon mirror 154 which scans the laser beams in the main scanning direction, fθ lens 155 which optically corrects the scanning angle, cylindrical lens 153 which performs optical correction, and mirror 157 for detecting horizontal synchronizing signals.

In FIG. 2, the part indicated as laser diode 151 may be a section comprised of an optical unit which includes multiple laser diodes and synthesizes multiple laser beams, or may be a multiple beam laser array configured in one unit. In the specific example described below, four light sources of LD_1-LD_4 are provided as laser diode 151.

The multiple laser beams scan the image carrier of photoreceptor drum 161 in the main scanning direction, while sub-scanning is conducted by the rotation of photoreceptor drum 161, whereby a latent image is formed on the surface of photoreceptor drum 161 according to the laser beams. In the case of a color image forming apparatus, an equivalent number of exposure unit 150 are provided based on the number of colors.

In the above configuration, image processing section 110 is a section to execute various processing necessary to the image processing, and in the present embodiment has a function to simultaneously output the image data for each of multiple lines corresponding to the multiple light sources, in order to execute simultaneous exposure of the multiple light sources.

Figure 4:
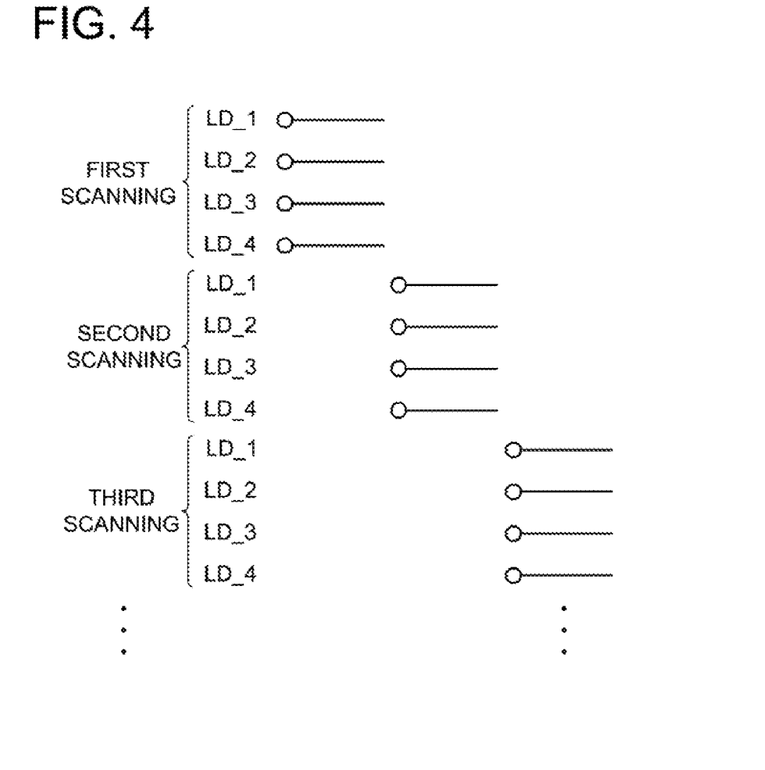
FIG. 4 is a timing chart to explain an operating state of the image forming apparatus relating to an embodiment of the present invention.
Figure 5:
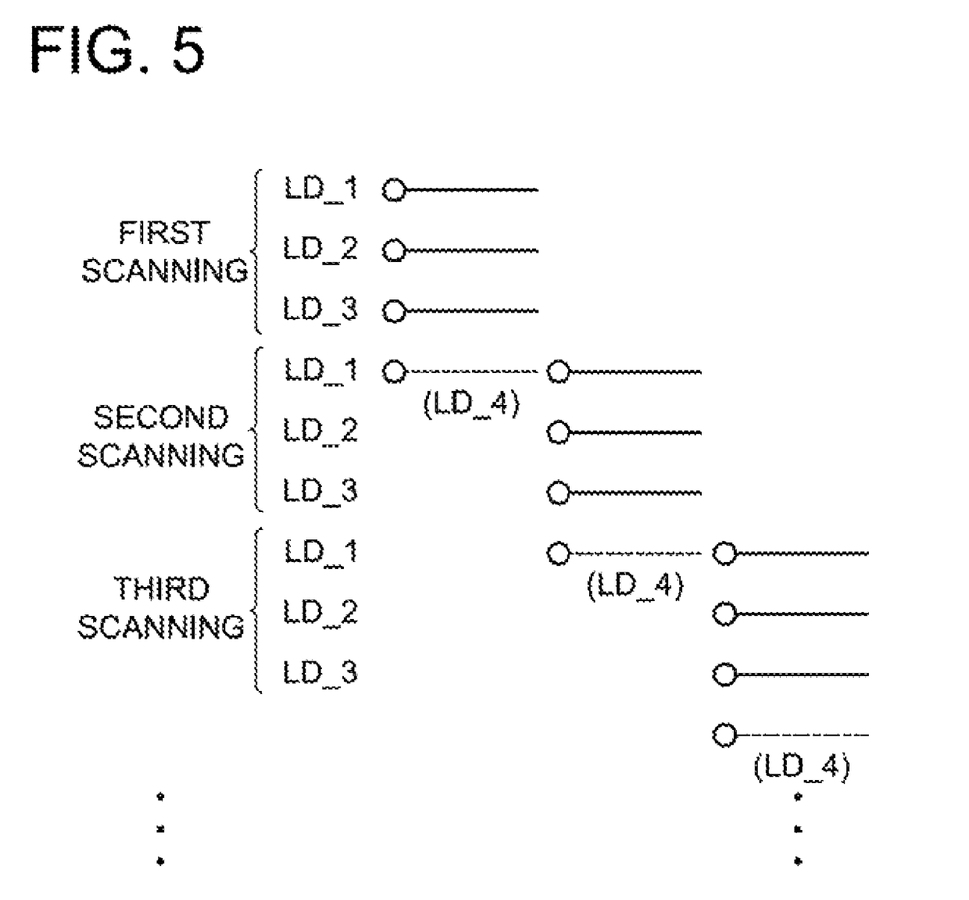
FIG. 5 is a timing chart to explain an operating state of the image forming apparatus relating to an embodiment of the present invention.

Hereinafter, the first operation (or the first embodiment) of image forming apparatus 100 will be described with reference to the schematic diagram of FIG. 4 showing a mode of the laser beam scanning, the schematic diagram of FIG. 5 showing another mode of the laser beam scanning, and timing charts of FIGS. 7(a)-(f).

As an example, in the first image forming mode, which being performed at the normal image forming speed, by using all four of the light sources (LD_1-LD_4) each one plane of the polygon mirror deflects for scanning the four laser beams simultaneously at one time to form a latent image on photoreceptor drum 161, as shown in FIG. 4.

Meanwhile, as another example, in the second image forming mode which is slower than the first image forming mode, by using three light sources (LD_1-LD_3) each one plane of the polygon mirror deflects for scanning three laser beams simultaneously at one time to form a latent image on photoreceptor drum 161, as shown in FIG. 5. In this example, LD_4 is in resting state, and only LD_1-LD_3 execute the image formation. In this case, the rotation speed of photoreceptor drum 161 in the sub-scanning direction is lowered to ¾ of the speed for the first image forming mode which results in the image forming speed of ¾. By this lowered image formation speed, fixing ability is improved in the fixing section.

For example, in the first image forming mode the image formation is conducted by four laser beams, with a resolution of 1200 dpi (1200 dots/25.4 mm), the first image formation speed in the sub-scanning direction of 280 mm/s, while with a polygon mirror of six planes, and the rotation speed of the polygon mirror is 33071 rpm.

Meanwhile, in the second image forming mode, the image formation is conducted by lowering the second image forming speed in the sub-scanning direction to 210 mm/s. In this case, if four laser beams are still used, normal image formation can be achieved by changing the rotation speed of the polygon motor to 24803 rpm, however, which is not preferable in that a further load is induced by this rotation speed change of the polygon motor, and some waiting time period is required until the rotation stabilizes. Thus, the image formation is conducted by three laser beams of LD_1-LD_3 without changing the rotation speed of the polygon mirror, and LD_4 is not used for the image formation.

In this case, since LD_4 is not used in the second image forming mode, LD_4 differs from LD_1-LD 3 in the frequency of usage and in the degree of deterioration.

Figure 6:
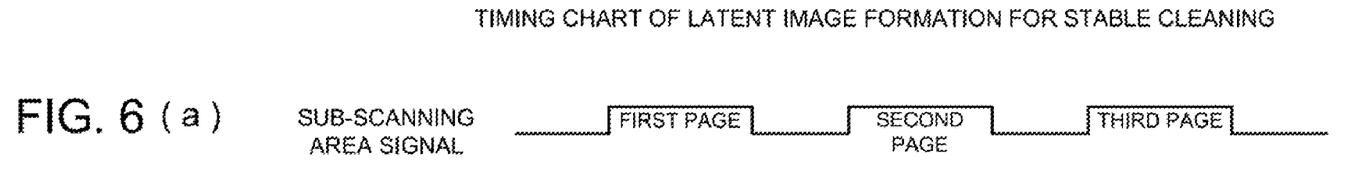
FIGS. 6(a)-(e) are timing charts explaining an operating state of the image forming apparatus relating to an embodiment of the present invention.

Therefore, in order to stabilize cleaning performance of the image carrier, patch images are formed between image formations by using only LD_4 as shown in FIG. 6(e).

Namely, laser control section 120 allows LD_4, which is not used in the second image forming mode, to form the patch images for stable cleaning at the timing other than the timing of image formation. The appropriate timing to form the patch images for stable cleaning is previously determined such as the timing after every page of image formation, for every job of image formation, or after every prescribed number of sheets of image formation.

Herein, the patch images for stable cleaning means a stripe of prescribed solid black patch image on the photoreceptor, each patch image being formed in the non-image area at the timing between individual image formation. The patch images cause periodical operation of the cleaning section to remove residual toners on photoreceptor drum 161, which helps to realize stable cleaning operation.

In FIGS. 6(a)-(e) illustrated is the case where the patch images for stable cleaning are formed by LD_4 in the second image forming mode while image formation is conducted by using LD_1-LD_3. Further, by allowing LD_4 to form the patch images for stable cleaning also in the first image forming mode where image formation is conducted by using all LD_1-LD_4, the difference of deterioration state between each light sources can be further reduced.

Figure 7A:
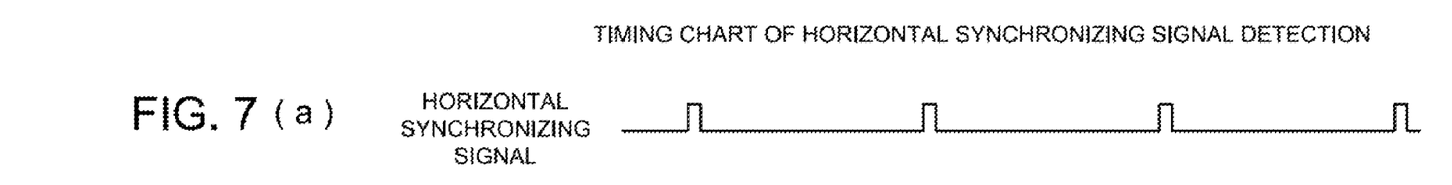
FIGS. 7(a)-(f) are time charts explaining an operating state of the image forming apparatus relating to an embodiment of the present invention.
Figure 7B:
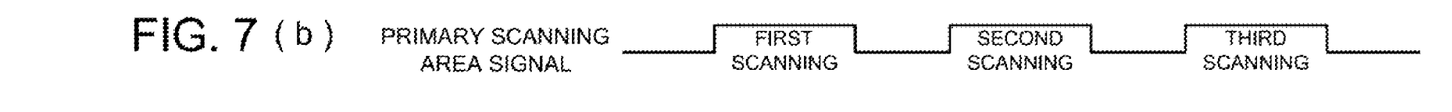
Figure 7C:
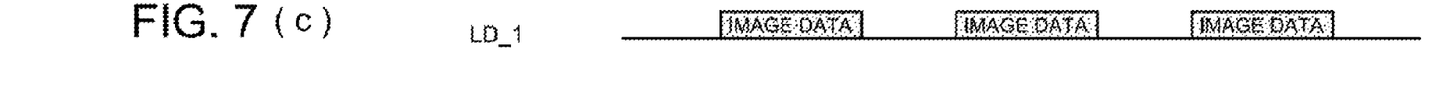
Figure 7D:
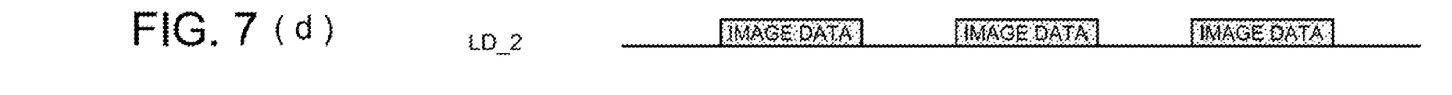
Figure 7E:
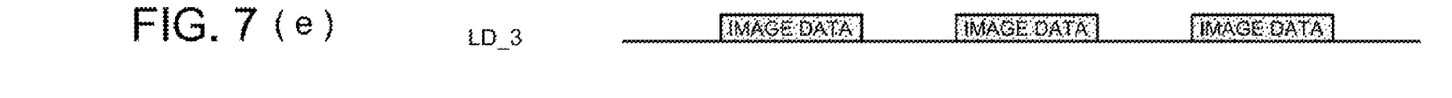
Figure 7F:
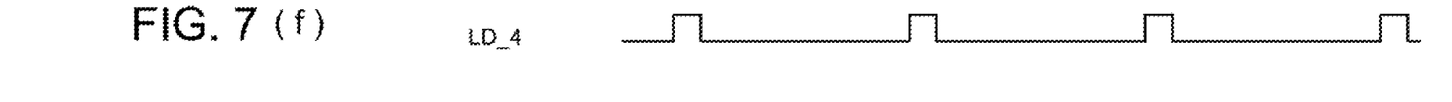

Further, as shown in FIG. 7(a), previous to image formation, a laser beam is irradiated onto horizontal synchronizing sensor 158 outside the image area in the horizontal direction to detect horizontal synchronizing signals. In this case, the emission of the laser beams is conducted by LD_4 as shown in FIG. 7(f).

Namely, laser control section 120 allows LD_4, which is not used in the second image forming mode, to emit laser beams for detecting the horizontal synchronizing signals at the timing other than the timing of image formation. This laser beam emission for detecting the horizontal synchronizing signals is conducted for every horizontal scanning.

In FIGS. 7(a)-(f) illustrated is the case where the irradiation of laser beams for detecting the horizontal synchronizing signals is conducted by LD_4 in the second image forming mode where image formation is conducted by using LD_1-LD_3. Further, by allowing LD_4 to emit laser beams for detecting the horizontal synchronizing signals also in the first image forming mode when image formation is conducted by using all LD_1-LD_4, the difference of deterioration state among each light sources can be further reduced.

Further by conducting a combination of the formation of the patch images for stable cleaning by LD_4 shown in FIGS. 6(a)-(e), and the emission of laser beams for detecting the horizontal synchronizing signals by LD_4 shown in FIGS. 7(a)-(e), the difference of deterioration state among each light sources can be further reduced.

Further, it is preferable to provided a counter to count the emission duration of each light source and a memory to memorize the counter values, and to allow LD_4 to form the patch images for stable cleaning, and also to emit laser beams for detecting the horizontal synchronizing signals, in cases where the emission duration by LD_4 is less compared to the emission duration of LD_1-LD_3, and further to allow all the light sources, not only LD_4, to form the patch images for stable cleaning or to emit laser beams for detecting the horizontal synchronizing signals, in cases where the emission duration by LD_4 is almost same as that of LD_1-LD_3.

In an image forming apparatus having a plurality of exposure units 150, corresponding the number of colors such as Y M C K, for simultaneously conducting multiple lines of exposure by scanning multiple laser beams onto photoreceptor drum 161 as an image carrier in the main scanning direction, by allowing each exposure unit 150 for each color (150Y, 150M, 150C, 150K: but not illustrated) to conduct the above described control by laser control section 120 independently for each color, the deterioration state of each light sources of multiple laser beams at the time of image exposure can be equalized in each color exposure unit. Thereby, a color image forming apparatus, which is capable of using the light sources in stable conditions, can be realized.

Although explained in the above description is a specific embodiment to conduct slower speed image formation by using three light sources out of four light sources, the number of total light sources and the number of light sources in the slower speed mode are not limited to this embodiment, and various versions are possible. Further, in cases where the rotation speed of the polygon motor can be stably changed, the combination of polygon motor rotation speed change and the above light source control can be utilized.

Other Embodiments

In the first embodiment, the specific example are described where, as the emission of the light sources used for other than the image formation, emission for latent image formation for stable cleaning of the image carrier, and emission for detection of horizontal synchronizing signals, however, the present invention is not limited to these examples. It is preferable to utilize emission of the light sources for other functions than the image formation in the case of a latent image or patch formation other than cases where patches are formed in order to control toner density or latent image voltage, since such utilization in the latter cases is not preferable.

In the first embodiment, described is an electro-photographic image forming apparatus utilizing laser beams, though the present invention is not limited to this embodiment. It is possible to equally achieve good results by applying each embodiment of the present invention to various image forming apparatus such as a laser imager which exposes photographic paper using laser beams.

Further, light sources other than laser diodes (LD) are applicable.

As described above, according to the present invention, in an image forming apparatus for simultaneously conducting multiple lines of exposure by scanning multiple laser beams from multiple light sources onto an image carrier in the main scanning direction, control for image formation is possible with two types of image forming modes: namely in a first image forming mode an image being formed at a first image forming speed by using all the multiple light sources, and in a second image forming mode the image being formed without using at least one of the multiple light sources, while a second image forming speed slower than the first image forming speed, wherein, a light source which is not used in the second image forming mode emits light outside of the image area where the image is formed based on image data. Therefore, without causing degradation of image quality, the deterioration state of each light source of multiple laser beams at the time of image exposure can be equalized. This ensures realization of an image forming apparatus which is capable of using the light sources in stable conditions.

According to the present embodiment, executed is the second image forming mode at the second image forming speed slower than the first image forming speed by changing a number of active light source without changing the rotation speed of the polygon mirror between the first image forming mode and the second image forming mode, wherein, a light source which is not used in the second image forming mode emits light outside of the image area. Then, without causing image quality degradation, the deterioration state of each light source of multiple laser beams at the time of image exposure can be equalized. This ensures to realize an image forming apparatus which is capable of using the light sources in stable conditions.

According to the present embodiment, in an image forming apparatus, light emission outside the image forming area is an emission for latent image formation to stabilize cleaning of the image carrier. Therefore, without requiring unnecessary emission or unnecessary time, and without causing degradation of image quality, the deterioration state of each light source of multiple laser beams at the time of image exposure can be equalized. This ensures realization of an image forming apparatus which is capable of using the light sources in stable conditions.

According to the present embodiment, in an image forming apparatus, light emission outside the image forming area is an emission for detecting horizontal synchronization signals. Therefore, without requiring unnecessary emission or unnecessary time, and without causing degradation of image quality, the deterioration state of each light source of multiple laser beams at the time of image exposure can be equalized. This ensures realization of an image forming apparatus which is capable of using the light sources in stable conditions.

What is claimed is:

1. An image forming apparatus for simultaneously conducting multiple lines of exposure by scanning multiple laser beams from multiple light sources onto an image carrier in a main scanning direction, comprising:
   multiple light sources which are driven to emit laser beams based on image data; and
   a control section capable of controlling an image formation in two types of image forming modes of a first image forming mode where an image is formed at a first image forming speed by using all the multiple light sources, and a second image forming mode where the image is formed without using at least one of the multiple light sources at a second image forming speed slower than the first image forming speed,
   wherein, the control section controls a light source which is not used in the second image forming mode to emit a laser beam onto outside of an image area where the image is formed based on the image data, and
   wherein the laser beam emission onto outside of the image area is an emission for latent image formation to stabilize cleaning of the image carrier.

2. The image forming apparatus of claim 1, further comprising a polygon mirror which scans the laser beams from the multiple light sources in a main scanning direction,
   wherein the control section executes the second image forming mode at the second image forming speed slower than the first image forming speed by changing a number of used light sources without changing a rotation speed of the polygon mirror between the first image forming mode and the second image forming mode.

3. The image forming apparatus of claim 1, wherein the control section controls the light source which is not used in the second image forming mode to emit the laser beam onto outside of an image area at least at any one previously determined timing of every page of image formation, every job of image formation, and every prescribed number of image formed sheets.

4. The image forming apparatus of claim 1, the laser beam emission onto outside of the image forming area further comprises an emission for detecting a horizontal synchronization signal.

5. The image forming apparatus of claim 1, comprising a plurality of exposure units, each exposure unit being provided for each of multiple colors for simultaneously conducting multiple lines of exposure by scanning multiple laser beams from multiple light sources onto an image carrier in a main scanning direction,
   wherein the control section controls the each exposure unit independently.

6. An image forming method for forming images with an image forming apparatus for simultaneously conducting multiple lines of exposure by scanning multiple laser beams from multiple light sources onto an image carrier in a main scanning direction, the method comprising the steps of:
   executing an image forming mode by selecting out of two types of image forming modes of a first image forming mode where an image is formed at a first image forming speed by using all the multiple light sources, and a second image forming mode where the image is formed without using at least one of the multiple light sources at a second image forming speed slower than the first image forming speed; and
   allowing a light source, which is not used in the second image forming mode, to emit a laser beam onto outside of an image area where the image is formed based on the image data,
   wherein the laser beam emission onto outside of the image area is an emission for latent image formation to stabilize cleaning of the image carrier.

7. The image forming method of claim 6, the laser beam emission onto outside of the image forming area further comprises an emission for detecting a horizontal synchronization signal.

8. A computer-readable storage medium stored therein a program for a computer of an image forming apparatus for simultaneously conducting multiple lines of exposure by scanning multiple laser beams from multiple light sources onto an image carrier in a main scanning direction, the program allowing the computer to execute the steps of:
   executing an image forming mode by selecting out of two types of image forming modes of a first image forming mode where an image is formed at a first image forming speed by using all the multiple light sources, and a second image forming mode where the image is formed without using at least one of the multiple light sources at a second image forming speed slower than the first image forming speed; and
   allowing a light source, which is not used in the second image forming mode, to emit a laser beam onto outside of an image area where the image is formed based on the image data,
   wherein the laser beam emission onto outside of the image area is an emission for latent image formation to stabilize cleaning of the image carrier.

* * * * *